Nov. 8, 1927.  
C. S. BRAGG ET AL  
1,648,291  
BRAKE MECHANISM FOR AUTOMOTIVE VEHICLES  
Filed Nov. 25, 1925   3 Sheets-Sheet 1

Nov. 8, 1927.

C. S. BRAGG ET AL 1,648,291

BRAKE MECHANISM FOR AUTOMOTIVE VEHICLES

Filed Nov. 25, 1925    3 Sheets-Sheet 3

INVENTORS
Caleb S. Bragg and
Victor W. Kliesrath
By Louis Hicoos Whitaker
ATTORNEY Patented Nov. 8, 1927.

1,648,291

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

BRAKE MECHANISM FOR AUTOMOTIVE VEHICLES.

Application filed November 25, 1925. Serial No. 71,271.

Our invention consists in the novel features hereinafter described, reference being had to the accompanying drawings which illustrate one embodiment of the invention, selected by us for purposes of illustration, and the said invention is fully disclosed in the following description and claims.

In the operation of brake mechanism, and particularly the brake mechanism for automotive vehicles, it is customary to connect the brake actuating means, which in its simplest form is the usual pivoted brake lever operated by the foot or hand of the operator, with the several brake mechanisms of the vehicle or vehicles with which the brake system is installed, by means of a rock shaft or rock shafts, provided with an operating arm connected to the operator operated part by a link or rod, and rotating the rock shaft, said rock shaft being also provided with operated arms which are connected by links or rods with individual brake mechanisms, the leverage ratios of the operating and operated arms being constant throughout their movement and usually substantially equal, or as one to one. It is also customary to operate the service brakes by a foot lever in order to avoid the necessity of the driver removing a hand from the steering wheel and the emergency brake mechanism with which such vehicles are usually provided are ordinarily operated by a hand operated lever. Owing to the limitations of the human body when in seated position, and the location of the steering wheel which permits only a limited movement of the foot or hand, the amount of throw of the foot pedal or hand lever is limited, and as the links connected to the operator operated lever are necessarily placed nearer to the point of pivoting them to the pedal or hand engaging portions in order to give the operator as great a leverage as possible, the extent of movement of that portion of the operator operated part, to which the linkage is connected, is limited to a few inches, usually less than three inches. In the installation of these brake mechanisms commercially, the pedals or levers operate through slots or openings in the footboard of the vehicle, which ordinarily permit little more than a normal limited movement of these operator operated parts, and the brake mechanism is adjusted when the apparatus is installed so that the brakes will be fully applied within the limited movement of the operator operated parts. With the wear of the braking surfaces, and the wear of the pivotal connections, between the links and levers interposed between the operator operated parts and the brake mechanisms, in the operation of the mechanism, is brought about a condition when the operator operated parts, when moved as far as possible under the physical limitations of the operator or those imposed by the construction of the vehicle, will not fully apply the brakes, and it thereupon becomes necessary to adjust the brake mechanism or its connections with the operator operated parts, or both, to take up the slack resulting from wear. On heavy vehicles, such as trucks and busses, especially if operated on heavy grades or in traffic, it is sometimes necessary to adjust the brake mechanism every day, and to do so, and keep the brake mechanism at all times in efficient operating condition, necessitates very considerable labor and expense, and failure to maintain the brake mechanism in proper adjustment may result in serious accident and even in loss of life.

Our present invention relates to brake mechanism for automotive vehicles, in which the application of the brakes is effected normally by means of a power actuator operated by differential pressures, and most conveniently operated by atmospheric air working against a partial vacuum or rarification obtained from a source of suction, as from the intake manifold of the internal combustion engine which supplies power for propelling the vehicle, the actuator piston being connected with the brake mechanism and the operator operated part being connected to reversing valve mechanism for controlling the actuator and normally operating only the valve mechanism, against a light retracting spring, the operator operated part being also connected to the actuator piston by means permitting lost motion, so that the operator may add his physical power to that of the actuator when desired, and may positively actuate the actuator piston and the brake mechanism connected therewith, in case of failure of power.

Our invention consists in a novel arrangement of operating and operated arms, interposed in the connections between the actuator piston and the brake mechanism, or between the operator operated part and the brake mechanism, or the reversing valve mechanism of the actuator or both whereby the throw of the operator operated part is materially reduced in extent, and the said operating and operated arms are so arranged that during the first portion of the movement of the operating arm, it will operate with decreased leverage (less than 1 to 1, for example) to shorten its throw, and will then assume a position with respect to the operated arm which will give it an increased leverage, as, for example, a 1 to 1 leverage, with respect thereto, during the latter portion of its movement. This is practical in the case of the connections between the actuator piston and the brake mechanism, as the first portion of the movement of the piston takes up the slack and moves the braking surfaces into contact without the necessity of overcoming serious resistance beyond that of the usual retracting springs, and this the actuator is abundantly able to do at decreased leverage, while it exerts its full power at the greater leverage during the last portion of the movement necessary to apply the heavy friction between the braking surfaces, necessary to slow or stop the vehicle, or hold it against over speeding on down grade. Our construction also permits this to be accomplished with a shorter piston stroke, thus reducing the amount of atmospheric air or higher pressure fluid admitted to the actuator cylinder to effect the stroke, and also correspondingly reducing the amount of air or higher pressure fluid to be exhausted therefrom after a power stroke and delivered into the intake manifold of the motor. Our invention is also entirely practical in the connections between the operator operated part and the valve actuating mechanism of the actuator, for the reason that the operator's physical force is normally exerted only for the purpose of moving the reversing valve mechanism of the actuator, and in some instances, overcoming a light retracting spring, and is not ordinarily required to actually apply the brakes, and our invention also provides that when the operator desires to add his physical force to that of the actuator in the application of the brakes or to actually apply braking pressure in case of failure of power, his physical force will be transmitted to the brake mechanism at the higher leverage (as 1 to 1) through the operating and operated arms.

By our invention we are enabled to materially reduce the throw of the operator operated lever and also the actuator piston, leaving a very considerable leeway through which it may still be moved beyond the extreme of its normal operation to apply the brakes, when the brake mechanism is first adjusted. This will take care of the ordinary wear on the braking surfaces and connecting devices for a long period and permits of greatly longer periods of use between adjustments of the brake mechanism, effecting a very material saving of time and money, and also maintaining the brake mechanism for greatly longer periods in the highest condition of efficiency.

In the accompanying drawings we have illustrated an embodiment of our invention in a brake mechanism for an automotive vehicle, in which.

Figure 1:
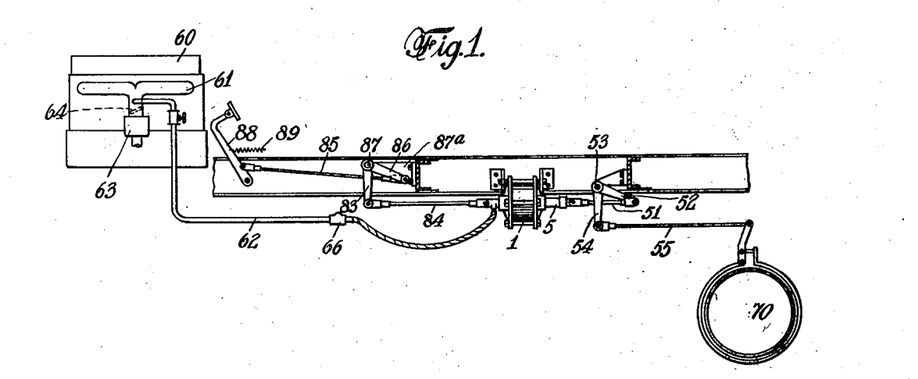
Fig. 1 shows a diagrammatic view of a brake mechanism, including a power actuator connected by a suction pipe with the intake manifold of an internal combustion engine which propels the vehicle, and operatively controlled by an operator operated lever.

Referring to the drawings, 60 represents in this instance the internal combustion engine for propelling the vehicle, provided with the intake manifold, 61, and throttle valve, 64, and carburetor, 63, the manifold being connected in this instance by a suction pipe, 62, a portion of which is flexible, with a power actuator, the cylinder of which is indicated at 1, and is provided in this instance with a double acting piston, (see Fig. 4), having a brake actuating piston rod, 5, and reversing valve mechanism, hereinafter described and operated by means of a longitudinally movable valve actuating sleeve, 20, connected with a foot lever, 88, provided with the usual retracting spring, 89.

Figure 4:
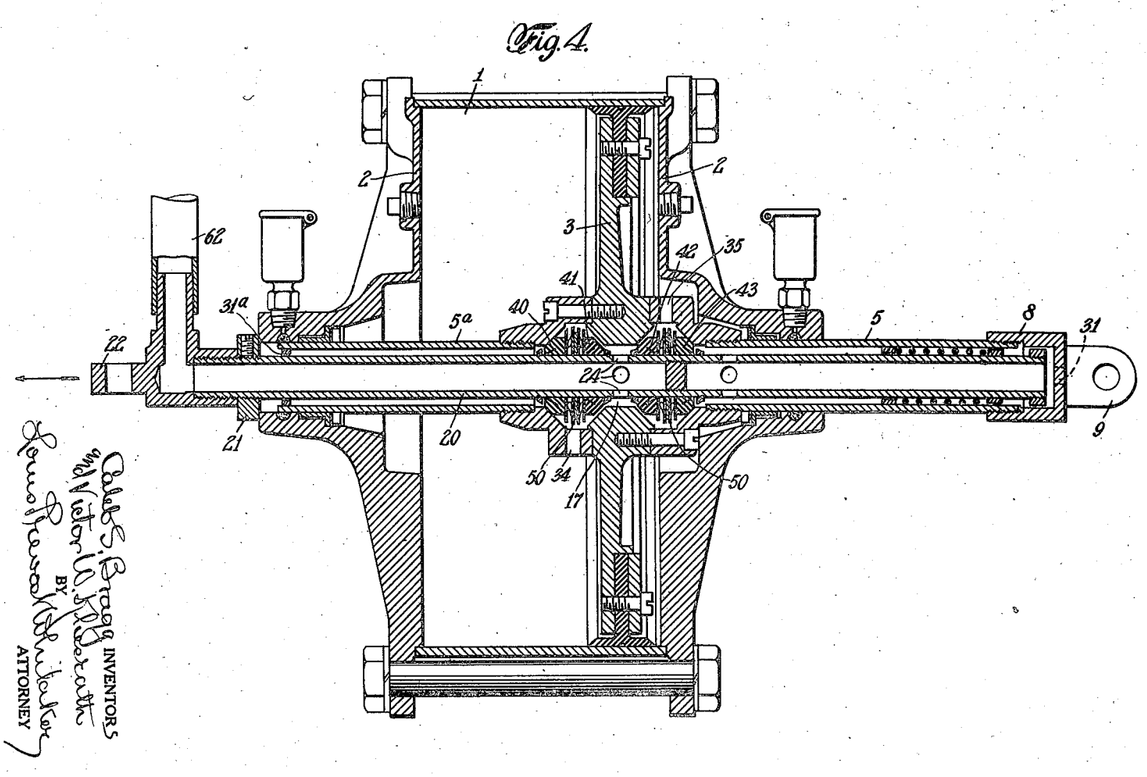
Fig. 4 is an enlarged sectional view of one form of power actuator, indicated in Fig. 1, which may be conveniently employed in carrying out our invention.

While the details of the construction of the actuator form no part of our present invention, it will be necessary to briefly describe the same in order that our invention may be clearly understood. The form of actuator herein shown comprises a cylinder, 1, closed at each end by heads, 2, and containing the double acting piston, which is preferably provided with hollow piston rods, 5 and 5ª, extending through stuffing boxes in the opposite ends of the cylinder, the piston rod, 5, being preferably provided with a cap, 8, having a lug, 9, for facilitating the connection of the piston rod, 5, with the brake mechanism to be actuated thereby. The reversing valve mechanism for the actuator is preferably located in the hub of the piston, and includes air inlet valves, 40, and 43, and suction valves, 41 and 42, normally held seated by suitable yielding means, as spring washers, indicated generally at 50. These valves are preferably made of molded rubber and have central apertures engaging the valve actuating sleeve, 20, which they fit tightly, while permitting the movement of the valve actuating sleeve therethrough. The sleeve, 20, is provided with collars adjacent to the face of each valve, and so arranged that when the sleeve is in normal position, and the piston, 3 is in normal or off position, the sleeve will be arrested by a collar, 21, engaging the adjacent head, 2, of the cylinder, so as to hold both suction valves, 41, 42, in slightly open position and connect the cylinder on both faces of the piston by means of passages, 34 and 35, from the chambers in which the valves are located, with a suction chamber, 17, connected by apertures, 24, with the interior of the sleeve, 20, said sleeve being connected with the suction pipe, 62, as before stated. The suction pipe, 62, is conveniently provided with a check valve, 66, and with restricting means, for preventing too rapid distribution of air to the intake manifold, as an adjustable regulating valve, 65, and the sleeve, 20, is also provided with a lug or projection, 22, for connecting it with the operator operated part. Air may be admitted to either of the valve chambers shown, under the control of the respective air inlet valves, 40 and 43, through the adjacent hollow piston rod, 5, being connected with the atmosphere in this instance by an aperture, 31, in the cap, 8, and piston rod, 5ª, being connected with the atmosphere by apertures, 31ª, in a guide collar at its outer end surrounding the sleeve, 20. Atmospheric air may therefore be admitted in rear of the piston by the opening of the valve, 43, to apply the brakes, at which time the suction valve, 42, will be closed, and the suction valve, 41, opened to a greater extent, and atmospheric air can be admitted forward of the piston by opening valve, 40, at which time valve, 41, will be closed and valve, 42, opened.

As shown in Fig. 4, the sleeve, 20, is connected with the piston by means permitting a sufficient amount of lost motion to insure the operation of the valve. To this end the sleeve, 20, is provided with a collar, 22, located between the outer end of the cap, 8, and a collar, 5ª, projecting inwardly from the hollow piston rod 5, to provide the necessary lost motion and permit the operator to add his physical force to that of the actuator, when desired, or to operate the piston to apply the brakes by his physical force alone in case of failure of power.

Figure 2:
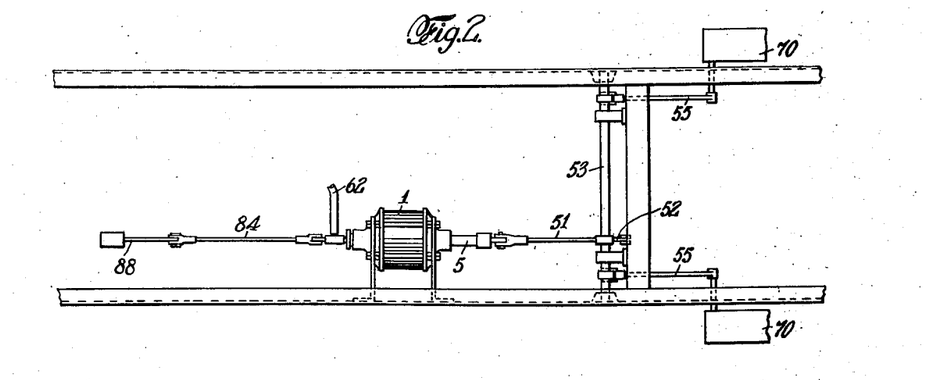
Fig. 2 represents a diagrammatic top plan view of the connections between the operator operated lever, the actuator, and certain brake mechanisms of the vehicle.
Figure 3:
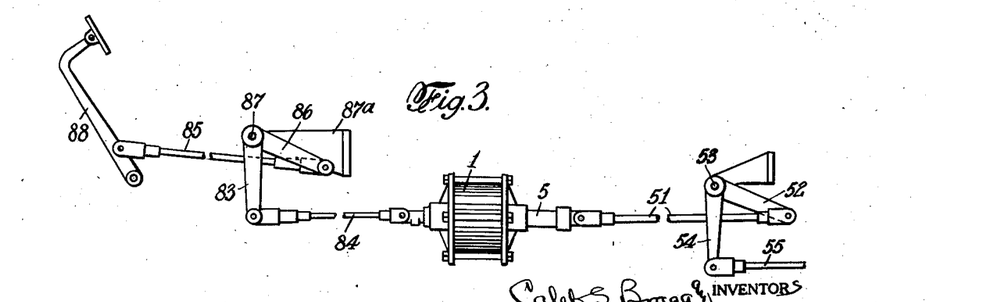
Fig. 3 is an enlarged side elevation of the parts illustrated in Fig. 2, omitting the brake mechanisms.

In this instance we have shown the actuator piston rod, 5, connected by a link or rod, 51, with an operating arm, 52, secured to a rock shaft, 53, extending transversely of the vehicle and provided at each side with an operated arm, 54. The arms, 54, are each connected by a link or rod, 55, with one of the brake mechanisms of the vehicles, indicated diagrammatically at 70.

Figures 5, 6:
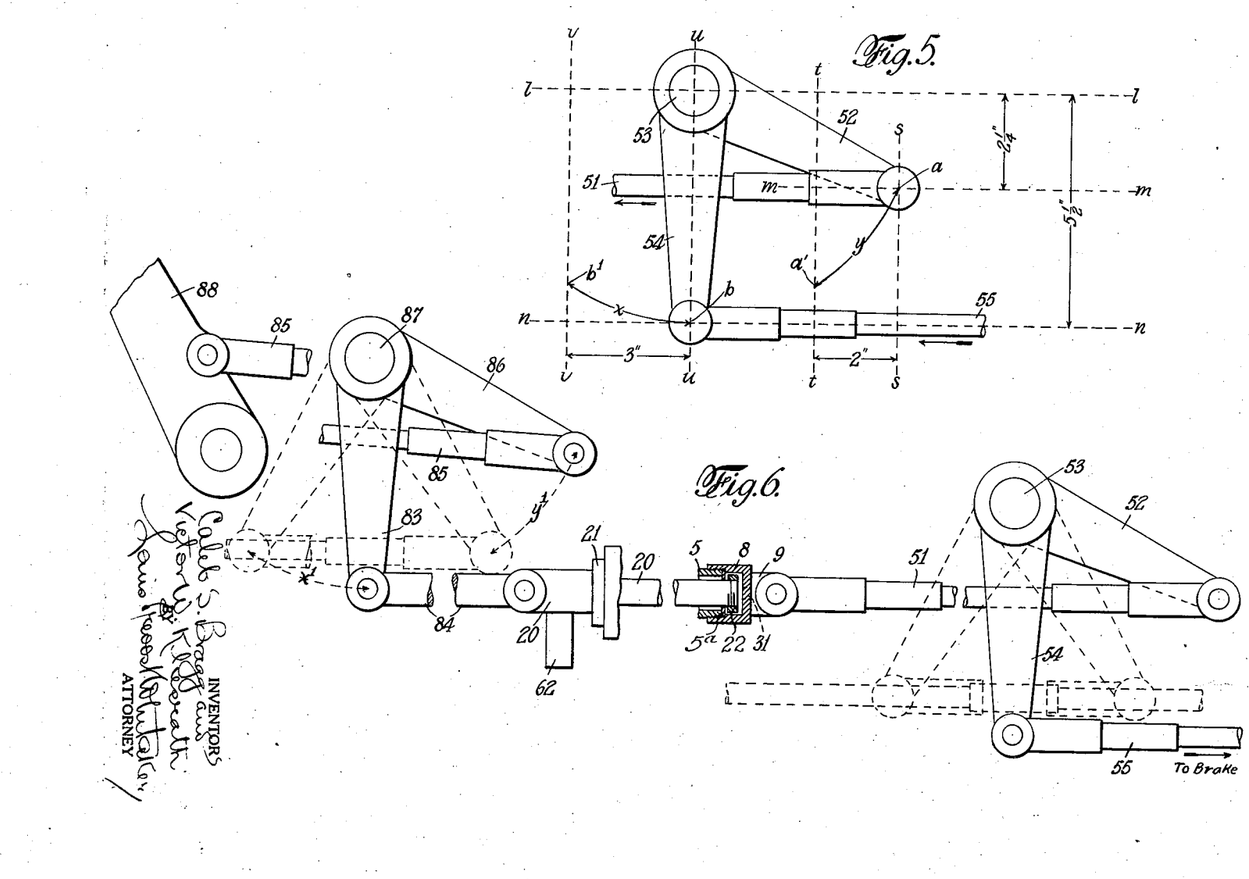
Fig. 5 is a schematic view of one set of connections embodying our invention, in this instance the connections between the actuator and the brake mechanism operated thereby, with construction lines applied thereto to indicate the changes of leverage and length of movement of the actuating and actuated arms.
Fig. 6 is a diagrammatic view drawn to an enlarged scale and illustrating the operative connections from the operator operated lever to the brake mechanism, parts being broken away to enable the parts shown to be presented in larger scale.

According to our invention, the operating and operated arms are arranged in a definite predetermined position with respect to the link rods or connections with which they are directly connected, which, for greater clearness, are illustrated in a diagram, Fig. 5, in which the arrows indicate the direction of movement of the various parts. For purposes of illustration, the operating and operated arms are in this instance of the same length that is to say, between their common axis and the axes of the pivotal connections with the rods, 51 and 55, respectively, but we do not wish to be limited to this construction. The operated arm, 54, or arms, is or are placed on the shaft, 53, so as to occupy a position substantially perpendicular to the direction of movement of the rod, or rods, 55, from the off position of the brakes and connected parts. The operating arm, 52, is connected to the operated arm or arms, 54, (in this instance being co-axial therewith and rigidly connected to a common rock shaft, 87) and is preferably disposed at an angle of less than substantially 45 degrees on its forward side to the line of movement of its connection with the power applying part, and its effective travel is preferably through an arc of less than substantially 45 degrees. This gives the first effective leverage of the operating arm, with respect to the operated arm, of considerably less than a one to one leverage, which necessitates that a greater forward movement will be imparted to rods, 55, connected to the outer end of the operated arms, 54, in moving through its operating arc, indicated at X, in the specific construction shown in Fig. 5, than will be imparted to the rod, 51, connected to the outer end of the arm, 52, in moving through its arc of movement indicated at Y, the latter arm having to move a considerable distance downwardly, as well as forward, and thereby reducing the extent of its forward movement. In this particular instance, the said arms are shown as being of substantially 5½" between centers. When in normal or off position, as shown in Fig. 5, the effective length of the arm, 52, indicated as the distance between the dotted lines, $l$ and $m$, and the effective length of the arm, 54, indicated between the dotted lines, $l$ and $n$, will be as 2¼" to 5½", or a leverage of about one to two and a half. The movement of the operating arm, 52, in the direction of movement of its connected link rod, 51, indicated by the dotted lines, $s$, $s$ and $t$, $t$, will be approximately two inches, while the corresponding movement of the operated arms, 54, in the direction of movement of the link rod, 55, connected thereto, indicated between the dotted lines, $u$, $u$, and $v$, $v$, will be approximately three inches, or one half greater.

It will also be noted that in moving from normal or off position, the effective length of the arm, 52, increases very rapidly through the arc, Y, approaching more and more nearly to a 1 to 1 ratio, and that as the arms, 54, move through the arc, X, their effective length is somewhat reduced, which contributes to the result of bringing the two arms into a substantially 1 to 1 ratio during the latter and most effective part of the stroke, so that when the pivotal axis, $a$, of the connection between arm, 52, and its rod, 51, reaches the end of the stroke, indicated at $a'$, in Fig. 5, and the corresponding points, $b$, of the arms, 54, simultaneously arrive at the points indicated at $b'$ in Fig. 5, they will have the same effective length and produce a 1 to 1 leverage ratio, as shown in dotted lines, Fig. 6. This arrangement is particularly efficient in the installation illustrated in Fig. 1, as the first portion of the movement of the arms, 52 and 54, merely effects the taking up of the slack, overcoming such retracting springs as may be present in connection with the brake mechanism, and the bringing of the friction surfaces of the brake mechanism into operative engagement without having to apply severe pressure, and the actuator has an abundance of power to accomplish this with a material reduction of leverage. This leverage, however, as has been seen, increases as the movement proceeds, so that when the friction surfaces of the brake mechanism are in contact, and actual force is vigorously applied for the purpose of stopping the vehicle, the arm, 52, and arms, 54, will be operating under substantially a 1 to 1 leverage ratio, and exactly the same efficiency of the brake mechanism will be obtained, while the actual forward movement of the actuator is reduced one-third that which would be necessary in an arrangement of levers in which the 1 to 1 ratio is obtained substantially through the range of movement. It will be seen that this lever construction is a matter of great importance in a brake mechanism of this character, and accomplishes the following important and novel results.

If the brakes are directly operated by the foot of the operator, a much shorter range of movement of the operator's foot is required to apply the brakes, making it more convenient for the operator and leaving such a considerable distance through which the pedal lever may yet travel under the effective operation of the operator's foot, that the stretching of connections and the wear of parts will be taken care of for a very long period between adjustments, instead of having to be so frequently adjusted, to take up and compensate for these factors, as is now the case. When the rod, 51, is actuated by the power actuator piston, it will be seen that the stroke of the piston in applying the brake mechanism is reduced practically one-third, so that a shorter cylinder may be used without danger of the piston reaching the opposite end of the cylinder before the brakes are fully applied. Another very important result is that as the piston is operating by the admission of atmospheric air or other higher pressure fluid, which must be withdrawn to permit the return of the piston to its normal position, this reduction in the piston stroke enables us to apply the brakes sufficiently by admitting approximately one-third less atmospheric air or other higher pressure fluid, and consequently reduces the quantity of air which must be withdrawn from the actuator and discharged into the intake manifold of the engine, by that amount, and contributes to the prevention of interference with the operation of the engine or its stalling if idling.

We also find it extremely desirable to insert the same lever construction between the brake pedal or other operator operated device and the controlling valve mechanism of the actuator. In this instance, we have shown the brake pedal, 88, connected by a horizontally disposed link, 85, with an operating arm 86, pivotally mounted at 87, and having an operated arm, 83, rigidly connected therewith, the latter being connected by a link, 84, with the valve actuating sleeve, 20. The pivot, 87, may be conveniently supported by a bracket, 87ª. If the foot lever is in substantial alignment with the actuator, the arms, 86, and 83, may be secured together or formed integrally and mounted on the pivot, 87, as above described, but if the actuator is out of alignment longitudinally of the vehicle, with the foot lever, a rock shaft will be employed in place of the pivot, 87, and the arms, 86 and 83, will be formed separately and rigidly connected to the rock shaft. The relative arrangement of the operating and operated arms, 86 and 83, is substantially the same as that described specifically with reference to Fig. 5, and it will be unnecessary to repeat this description. As a result, the arm, 86, moves through an arc, indicated at Y¹, in Fig. 6, with a forward movement of the link, 85, substantially one-third less than the forward movement of the link, 84, connected to the arm, 83, moving through the arc, X¹, and with the increasing leverage from approximately one to two and a half, up to a one to one leverage during the stroke. This is thoroughly practicable, as the foot lever normally operates merely the longitudinally movable valve actuating rod and the reversing valve mechanism. If it should be desired by the operator to add his physical force to that of the actuator after the friction surfaces have been brought into contact, the operator can readily do so by increased pressure on the pedal lever, as at that time the leverage ratio between the arms, 86 and 83, will be substantially as one to one. Also, in case of failure of power, and the operator finds it necessary to apply the brakes, and moves the foot lever so as to take up the limited motion between the valve actuating sleeve and the piston, his power will be effective, although at reduced leverage of the arms, 86, and the arm, 52, during the first portion of the movement of the parts, as he has merely to overcome the friction of the piston and take up the slack in the brake mechanism, and bring the friction surfaces thereof into contact. It will require very little pressure to overcome the friction of the piston, as the first movement of the sleeve, 20, will set the valves in such a position that the actuator cylinder will be vented and offer no resistance to the forward movement of the piston. By the time that the friction surfaces of the brakes have been brought into contact, both the arm, 86 and the arm, 52, will be in substantially the position indicated by dotted lines, in Fig. 6, and will be operating at the increased leverage ratio (in this instance, 1 to 1), with respect to the arms, 83 and 54, so that the brakes can be applied just as efficiently under these circumstances as would be the case with the usual arrangement, and with a reduction of substantially one-third in the actual travel of the foot lever or other operator operated part. It will be seen, therefore, that our invention is applicable to the connections between a power actuator and the brake mechanism operated thereby, to accomplish certain novel and highly useful results, and that it is also applicable in the connections between the foot lever or operator operated part and the controlling valve mechanism for the actuator, and that its operation in such position combines with the co-ordinated operation of the lever connections of similar character, between the actuator and the brake mechanism, to accomplish all of the results previously indicated, with the addition of the benefit of a reduced movement of the operator operated part in operating the valve mechanism, and also in applying the physical force of the operator directly to the brake mechanism, either to add it to the force of the actuator, or in case of failure of power.

In the specific forms shown in the drawings, the link rods connected with the operating and operated arms are substantially parallel, but this is not important and the link rods may be placed angularly with respect to each other if this is desirable. It is only necessary that the operating and operated arms shall each be placed at the proper angle to the line of movement of the link rod or connection to which it is attached, when in normal or off position, as hereinbefore described, i. e., the operated arm being substantially perpendicular to the line of movement of the link rod or other device connecting it to the brake mechanism (or other device) to be operated when in normal or off position, and the operating arm being disposed at an angle less than substantially 45 degrees on its forward side to the line of movement of the connection extending from it to the device from which power is received, the stroke of the operating arm being less than substantially 45 degrees.

What we claim and desire to secure by Letters Patent is:—

1. In a brake actuating mechanism for automotive vehicles, the combination with brake mechanism, of a power actuator therefor, including among its members a cylinder and piston, a pivoted operated arm, connections therefrom to the brake mechanism, normally disposed substantially perpendicularly to said arm, an operating arm co-axially pivoted with respect to the operated arm, and rigidly connected thereto, connections extending from the operating arm to the piston of the actuator, said operating arm being normally disposed at an angle of less than substantially 45 degrees to the line of movement of its connection, on the forward side of the arm, controlling valve mechanism for the actuator, and an operator operated part connected with the controlling valve mechanism, the connections between the piston of the actuator and the operating arm being constructed so as to effect the full application of the brakes during a movement of the operating arm through an arc of less than substantially 45 degrees, and connections between the operator operated part and the piston of the actuator, including means permitting lost motion whereby, by taking up said lost motion, the physical force of the operator may be applied to the brake mechanism through said arms and their connections, in addition to that of the actuator, or to operate the brake mechanism by the physical force of the operator in case of failure of power.

2. In brake mechanism for an automotive vehicle provided with an internal combustion engine having a suction passage and brake mechanism for the vehicle, the combination of a power actuator including among its members a cylinder, a piston therein, and controlling valve mechanism, means for connecting the actuator cylinder with the suction passage of the engine and with the atmosphere under the control of said valve mechanism, a pivoted operated arm, a connection therefrom to the brake mechanism normally disposed perpendicularly to said arm, an operating arm pivoted coaxially with and rigidly connected to the operated arm, a connection from the operating arm to the piston of the actuator, said operating arm being normally disposed at an angle of less than substantially 45° to the line of movement of its said connection on the forward side of the arm, the connection between said operating arm and the piston being such as to effect the operation of the brake mechanism during a movement of the operating arm through an arc of less than substantially 45°, and an operator operated part connected with said controlling valve mechanism for actuating the same, whereby the movement of the actuator piston will be less than that of the operated arm in the direction of its connection with the brake mechanism, and a correspondingly smaller quantity of air will be required to be exhausted from the actuator cylinder.

3. In brake mechanism for an automotive vehicle provided with an internal combustion engine having a suction passage and brake mechanism for the vehicle, the combination of a power actuator including among its members a cylinder, a piston therein, and controlling valve mechanism, means for connecting the actuator cylinder with the suction passage of the engine and with the atmosphere under the control of said valve mechanism, a pivoted operated arm, a connection therefrom to the brake mechanism normally disposed perpendicularly to said arm, an operating arm pivoted coaxially with and rigidly connected to the operated arm, a connection from the operating arm to the piston of the actuator, said operating arm being normally disposed at an angle of less than substantially 45° to the line of movement of its said connection on the forward side of the arm, the connection between said operating arm and the piston being such as to effect the operation of the brake mechanism during a movement of the operating arm through an arc of less than substantially 45°, an operator operated part connected with said controlling valve mechanism for actuating the same, whereby the movement of the actuator piston will be less than that of the operated arm in the direction of its connection with the brake mechanism, and a correspondingly smaller quantity of air will be required to be exhausted from the actuator cylinder, the operator operated part being connected with the piston of the actuator by means permitting lost motion, whereby the operator may, by taking up the lost motion, transmit his physical force to the brake mechanism through said coaxially operated and operating arms, and their connections.

4. In a brake actuating mechanism for automotive vehicles the combination with brake mechanism, of a power actuator comprising a cylinder, a piston therein, and controlling valve mechanism, a pivoted operated arm, connections therefrom to the brake mechanism, normally disposed substantially perpendicularly to the said arm, an operating arm pivoted coaxially with and rigidly secured to the operated arm, connections extending from the operating arm to the piston of the actuator, said operating arm being normally lisposed at an angle of less than substantially 45° to the line of movement of its said connection on the forward side of the arm, the connections between the piston of the actuator and the operating arm being constructed so as to effect the full application of the brakes during a movement of the operating arm through an arc of less than substantially 45°, an operator operated part for the reversing valve mechanism, a second pivoted operated arm, connections therefrom to the valve mechanism normally disposed substantially perpendicularly to said arm, a second operating arm pivoted coaxially with and rigidly connected to said second operated arm, connections extending from said second operating arm to the operator operated part, said second operating arm being normally disposed at an angle of less than substantially 45° on its forward side to its said connections, and having a throw of less than substantially 45°, said second operated arm being connected with the brake mechanism by means permitting lost motion, to permit the operator to add his physical force to that of the actuator and to apply the brake mechanism by his physical force in case of failure of power through said second coaxial operating and operated arms.

5. In a brake actuating mechanism for automotive vehicles, the combination with brake mechanism, of a power actuator comprising a cylinder, a piston therein, and controlling valve mechanism, a pivoted operated arm, connections therefrom to the brake mechanism normally disposed substantially perpendicularly to said arm, an operating arm pivoted coaxially with and rigidly secured to the operated arm, connections extending from the operating arm to the piston of the actuator, said operating arm being normally disposed at an angle of less than substantially 45° to the line of movement of its said connection on the forward side of the arm, the connections between the piston of the actuator and the operating arm being constructed so as to effect the full application of the brakes during a movement of the operating arm, through an arc of less than substantially 45°, an operator operated part for the reversing valve mechanism, a second pivoted operated arm, connections therefrom to the valve mechanism, normally disposed substantially perpendicularly to said arm, a second operating arm pivoted coaxially with and rigidly connected to said second operated arm, connections extending from said second operating arm to the operator operated part, said second operating arm being normally disposed at an angle of less than substantially 45° on its forward side to its said connections, and having a throw of less than substantially 45°, said second operated arm being connected with the piston of the actuator by means permitting lost motion, to permit the operator to add his physical force to that of the actuator and to apply the brake mechanism by his physical force in case of failure of power through said coaxially operated and operating arms, and said second coaxially operated and operating arms, and their connections.

6. In a brake actuating mechanism for automotive vehicles, the combination with brake mechanism, of a power actuator comprising a cylinder and piston and controlling valve mechanism, connections from said piston to the brake mechanism, a pedal lever for operating said valve mechanism, a pivoted operated arm, connections therefrom to the valve mechanism of the actuator, normally disposed substantially perpendicularly to said arm, an operating arm pivoted coaxially with and rigidly connected to the operated arm, and connections from the operating arm to the pedal lever, said operating arm being normally disposed at an angle of less than substantially 45° on its forward side with respect to the line of movement of its said connections and having an effective throw of less than substantially 45°.

7. In a brake actuating mechanism for automotive vehicles, the combination with brake mechanism, of a power actuator comprising a cylinder and piston and controlling valve mechanism, connections from said piston to the brake mechanism, a pedal lever for operating said valve mechanism, a pivoted operated arm, connections therefrom to the valve mechanism of the actuator, normally disposed substantially perpendicularly to said arm, an operating arm pivoted coaxially with and rigidly connected to the operated arm, and connections from the operating arm to the pedal lever, said operating arm being normally disposed at an angle of less than substantially 45° on its forward side with respect to the line of movement of its said connections and having an effective throw of less than substantially 45°, said operated arm being connected with the brake mechanism by means permitting lost motion, whereby the operator can apply his physical force to the brake mechanism through said operating and operated arms in addition to the power of the actuator or to operate the brake mechanism in case of failure of power.

8. In a brake actuating mechanism for automotive vehicles, the combination with brake mechanism, of a power actuator comprising a cylinder and piston and controlling valve mechanism, connections from said piston to the brake mechanism, a pedal lever for operating said valve mechanism, a pivoted operated arm, connections therefrom to the valve mechanism of the actuator, normally disposed substantially perpendicularly to said arm, an operating arm pivoted coaxially with and rigidly connected to the operated arm, and connections from the operating arm to the pedal lever, said operating arm being normally disposed at an angle of less than substantially 45° on its forward side with respect to the line of movement of its said connections and having an effective throw of less than substantially 45°, said operated arm being connected with the piston of the actuator by means permitting lost motion, whereby the operator can apply his physical force through said operating and operated arms, and the piston of the actuator to the brake mechanism in addition to the power of the actuator, or to operate the brake mechanism in case of failure of power.

9. In brake mechanism for an automotive vehicle provided with an internal combustion engine, having a suction passage and brake mechanism for the vehicle, the combination of a power actuator including among its members a cylinder, a piston therein and controlling valve mechanism located in the piston, means for connecting the actuator cylinder with the suction passage of the engine and with the atmosphere under the control of said valve mechanism, a pivoted operated arm, a connection therefrom to the brake mechanism, normally disposed perpendicularly to said arm, an operating arm pivoted coaxially with and rigidly connected to the operated arm, a connection from the operating arm to the piston of the actuator, said operating arm being normally disposed at an angle of less than substantially 45° to the line of movement of its said connection, on the forward side of the arm, the connection between said operating arm and the piston being such as to effect the operation of the brake mechanism during a movement of the operating arm through an arc of less than substantially 45°, a valve actuating part extending into the piston and moving with, and with respect thereto, an operator operated part, a second pivoted arm, a connection therefrom to the valve actuating part, disposed substantially perpendicularly to said arm, a second operating arm pivoted coaxially with and rigidly connected to the second operated arm, connections extending from the second operating arm to said operator operated part, said second operating arm being normally disposed at an angle of less than substantially 45° to the line of movement of its said connection on the forward side of the arm and having a throw of less than substantially 45°, said second operated arm being connected with the brake mechanism by means permitting lost motion.

10. In brake mechanism for an automotive vehicle provided with an internal combustion engine, having a suction passage and brake mechanism for the vehicle, the combination of a power actuator including among its members a cylinder, a piston therein and controlling valve mechanism located in the piston, means for connecting the actuator cylinder with the suction passage of the engine and with the atmosphere under the control of said valve mechanism, a pivoted operated arm, a connection therefrom to the brake mechanism, normally disposed perpendicularly to said arm, an operating arm pivoted coaxially with and rigidly connected to the operated arm, a connection from the operating arm to the piston of the actuator, said operating arm being normally disposed at an angle of less than substantially 45° to the line of movement of its said connection, on the forward side of the arm, the connection between said operating arm and the piston being such as to effect the operation of the brake mechanism during a movement of the operating arm through an arc of less than substantially 45°, a valve actuating part extending into the piston and moving with, and with respect thereto, an operator operated part, a second pivoted arm, a connection therefrom to the valve actuating part, disposed substantially perpendicularly to said arm, a second operating arm pivoted coaxially with and rigidly connected to the second operated arm, connections extending from the second operating arm to said operator operated part, said second operating arm being normally disposed at an angle of less than substantially 45° to the line of movement of its said connection on the forward side of the arm and having a throw of less than substantially 45°, said valve actuating part being connected with the piston of the actuator by means permitting lost motion.

In testimony whereof we affix our signatures.

CALEB S. BRAGG.
VICTOR W. KLIESRATH.